United States Patent [19]

Satz

[11] 4,238,513

[45] Dec. 9, 1980

[54] METHOD AND COMPOSTION FOR THE PRODUCTION OF FERMENTED SAUSAGE

[75] Inventor: Mark V. Satz, Elizabeth, N.J.

[73] Assignee: Trumark, Inc., Roselle, N.J.

[21] Appl. No.: 19,241

[22] Filed: Mar. 9, 1979

[51] Int. Cl.$^3$ .................. A23B 4/12; A23C 11/00
[52] U.S. Cl. ........................... 426/59; 426/646
[58] Field of Search ............... 426/56, 59, 646; 435/253

[56] References Cited

U.S. PATENT DOCUMENTS

| | | | |
|---|---|---|---|
| 2,907,661 | 10/1959 | Niven Jr. et al. | 426/59 |
| 2,945,766 | 7/1960 | Chaiet | 426/59 |
| 3,193,391 | 7/1965 | Jansen et al. | 426/56 |
| 3,561,977 | 2/1971 | Rothchild et al. | 426/59 |
| 3,814,817 | 6/1974 | Everson et al. | 426/56 |
| 4,013,797 | 3/1977 | Gryczka | 426/56 |
| 4,147,807 | 4/1979 | Gryczka et al. | 426/56 |

FOREIGN PATENT DOCUMENTS 590958 1/1960 Canada .................. 426/56
804296 11/1958 United Kingdom .................. 426/56

OTHER PUBLICATIONS

The American Type Culture Collection, Catalog of Strains I, Twelfth Ed. 1976, p. 93.

*Primary Examiner*—Robert A. Yoncoskie
*Attorney, Agent, or Firm*—Lee C. Robinson, Jr.

[57] ABSTRACT

An improved process for the production of dry or semi-dry sausage by the controlled fermentation of a meat emulsion through the addition of a starter culture of *Pediococcus pentosaceus* ATCC 10791. A desirable pH can be achieved at fermentation temperatures in the range of 50° F. to 80° F. in not more than 72 hours. In another embodiment of the invention the *Pediococcus pentosaceus* culture is combined with a second microorganism selected from the group of *Pediococcus cerevisiae, Streptococcus lactis* and all members of the family Micrococcus and all Micrococcusacae.

10 Claims, No Drawings

METHOD AND COMPOSITION FOR THE PRODUCTION OF FERMENTED SAUSAGE

BACKGROUND OF THE INVENTION

This invention relates to an improved method for the production of dry or semi-dry sausages by the addition of the bacterial concentrate *Pediococcus pentosaceus,* ATCC 10791. Through this invention the fermentation can be controlled to such a degree that the time required to obtain a desirable product is significantly reduced.

Dry and semi-dry sausage can generally be distinguished from other meat products in that they require a fermentation step. Historically, the processing of a meat emulsion into a sausage product by fermentation has been more an art than a science. In the traditional method of sausage manufacture, the meat mixture is first pan cured for two to three days after which it is stuffed and held in a "green room" or fermentation chamber to begin its fermentation cycle. During this fermentation cycle lactic acid is produced which in turn lowers the pH and imparts desirable flavor characteristics to the meat. In the case of dry sausage, the fermentation cycle is followed by a finishing or drying cycle wherein the sausage is dried to some minimal moisture content. Once it is processed the dry sausage can be stored for long periods of time without refrigeration. Examples of dry sausages include pepperoni, genoa salami, hard salami, San Francisco Italian style salami and others. The semi-dry sausage, which is only partially dried to some desirable moisture content, must be refrigerated to prevent the growth of microorganisms which may spoil the meat.

The fermentation step to which this invention is directed effectuates a conversion of the sugars present in a meat formulation to lactic acid. The presence of lactic acid reduces the pH of the meat emulsion thereby speeding up the curing process. As the pH of the sausage is lowered due to an increase in the amount of lactic acid, other products are formed which enhance the flavor of the sausage. To initiate the fermentation process the sausage is stuffed and held in a fermentation chamber at some suitable fermentation temperature.

Basically, two methods have been used to control the fermentation cycle in the processing of sausage. A first method involves maintaining the sausage internal temperature between 75° F. and 80° F. wherein the maximum temperature is achieved during the fermentation cycle. After a desired degree of fermentation has been reached, the sausage is placed in a drying cycle. The total time required to process sausage by this method is long, namely, about 18 days to 6 weeks.

A second method of processing the sausage is to maintain the sausage internal temperature during fermentation at some higher value in the range of 95° F. to 115° F. This fermentation cycle may then be followed by a drying step at 110° F. to 160° F. While the processing cycle for this method is shorter than that wherein the fermentation is carried out at a lower temperature, there are other disadvantages inherent to this method.

Initiation of the fermentation can be accomplished in a number of different ways. In the past the sausage manufacturer would rely on chance inoculation whereby advantage was taken of the natural bacteria or microorganisms present in the meat emulsion. These microorganisms would then ferment the nutrients in the meat to lactic acid. Another previously used method consisted of inoculating the meat with sausage from a prior batch (called "back slopping"). By this method the microorganisms present in the fermented sausage could be utilized to initiate fermentation of the meat emulsion.

Neither of these known methods offered the sausage manufacturer a reliable way to control the fermentation. Subsequently, commercial starter cultures consisting of certain microorganisms were developed. These cultures consisted of lactic acid producing microorganisms which when added to a meat emulsion under specified operating conditions, would convert the nutrients present in the meat formulation into lactic acid. A number of bacteria for use as starter cultures have been disclosed in the prior art. A commonly used starter culture for the fermentation of a meat emulsion to produce sausage is one consisting of *Pediococcus cerevisiae,* also known as *Pediococcus acidilactici.* Later developments in the art involved the use of different bacteria in an attempt to control the fermentation more effectively. On such bacteria was the *Lactobacillus plantarum* NRRL-B-5461.

In all of the processes used prior to the availability of starter cultures there was difficulty in obtaining consistent and uniform sausage. Also, the required processing times were lengthy. The use of starter cultures such as *Pediococcus cerevisiae* made it possible for sausage manufacturers to improve control of the fermentation cycle and to obtain a more uniform sausage. None of the starter cultures previously used have been able to satisfy all of the needs of the sausage manufacturer.

A need exists for a finished sausage product which has a desirable or traditional flavor, color and texture and which can be produced as quickly as possible. To obtain the desired flavor the pH in the sausage must be accurately controlled. When fermenting at low temperatures, i.e., below 80° F., the previously used cultures become less effective and as a result do not allow for acceptable pH control. This lack of pH control renders it impossible to achieve the desired flavor.

Similarly, if fermentation is conducted at higher temperatures above 80° F., the processing can be completed in a shorter time but the flavor characteristics are altered due to the higher temperature. In addition, while the commercially available cultures increase the speed of the fermentation cycle, operating at higher temperatures significantly increases the risk of stimulating the growth of putrefying or contaminating bacteria such as *Staphylococcus aureus.* Since the Staphylococcus strain is aerobic and grows in the outer ring of the stuffed sausage, the cultured used to ferment the sausage has little inhibitory effect. Consequently, as the fermentation temperature is increased, a greater growth of pathogenic microorganisms is realized.

There are additional processing problems when operating at higher temperatures including fat rendering and overall handling of the product.

SUMMARY OF THE INVENTION

It is accordingly an object of the present invention to provide an improved method of producing dry or semi-dry sausage using a Pediococcus pentosaceus ATCC 10791 culture wherein the fermentation cycle can be controlled such that the desirable flavor characteristics can be achieved.

It is another object of the present invention to provide a method and composition to produce a dry or semi-dry sausage with desirable flavor characteristics in a relatively short period of time while simultaneously minimizing the growth of contaminating microorganisms.

It is further object of the invention to provide an improved method and composition for treating dry or semi-dry sausage in a rapid and economical manner.

Other objects of the invention will be in part obvious and in part pointed out hereafter.

GENERAL DESCRIPTION

The objects and advantages of the present invention may be achieved, in general, by carrying out the fermentation through the use of a culture of *Pediococcus pentosaceus* ATCC 10791 containing $10^8$ to $10^{13}$ viable cells per milliliter which is added in an amount of from 0.1% to 10% based upon the weight of the meat emulsion.

In a particularly preferred embodiment of the invention, the fermentation cycle is completed by attaining a pH of 5.0 or less in not more than 24 hours while maintaining the temperature in the range of from 70° to 80° F.

While it is true that the use of starter cultures such as *Pediococcus cerevisiae* are broadly known, none of the previously proposed processes effectively combine the low temperature fermentation, namely, 50° F. to 80° F., with a short fermentation cycle of not more than 72 hours to obtain a desirable sausage product with a pH of less than 5.0.

The improved method of the invention does not require any modification of the usual steps taken to process sausages. The desired meats are mixed and comminuted to form a meat emulsion to which curing agent are added. Nutrients and spices are added along with a culture of *Pediococcus pentosaceus*. The culture can be in either a freeze-dried, frozen or liquid-stabilized condition before it is mixed with water and added to the meat emulsion.

In accordance with another embodiment of the invention, it is advantageous to combine the lactic acid producing microorganism *Pediococcus pentosaceus* with a second microorganism selected from the group of *Pediococcus cerevisiae, Streptococcus lactis* and all members of the family of Micrococcus and all Micrococcusacae. The *Pediococcus cerevisiae* can be effectively combined in an amount of 33% to 67% by weight of the culture. Similarly, the Microccus strain can be added in an amount of 10% to 30% by weight of the culture.

Through this invention it is possible to maintain a fermentation temperature in the range of 50° F. to 80° F. without any significant decrease in the activity of the *Pediococcus pentosaceus* culture. In addition, the pH can be accurately controlled resulting in a consistent and desirable flavor not heretofore possible using previously known cultures. Since the fermentation cycle is carried out at a relatively low temperature, a substantially reduced amount of contaminants such as Staphylococcus aureous are produced as compared to processing done at temperatures above 80° F.

An additional advantage of the present invention is the overall economic benefit derived from the reduced processing time. Since sausage can be controllably fermented by this invention at a temperature in the range of 50° F. to 80° F., it would be possible to eliminate the need for a fermentation chamber. By controlling the moisture content of the meat emulsion, a fermented sausage product with all the desired characteristics could be produced at room temperature.

SPECIFIC DESCRIPTION

A suitable method of evaluating the effectiveness of a starter culture is through a beaker sausage test. Since the culture is a lactic acid producing microorganism, its activity can be measured by its effect on the acidity or pH of the sausage. The following tests were conducted to measure the pH as a function of fermentation time using a *Pediococcus pentosaceus* culture in one test and a *Pediococcus cerevisiae* in another. The precedures followed in both tests were identical except for the use of the different starter cultures.

A culture concentrate containing $150 \times 10^9$ viable cells per gram of *Pediococcus pentosaceus* was added to a meat formulation. The culture was prepared by mixing it with water in a ratio of 10 grams per 8 ozs. of water. This solution was then added to the meat mixture to a concentration of 0.5% based on the weight of the meat mixture. The meat formulation consisted of 50% Beef and 50% Pork containing 156 ppm sodium nitrate and $3\frac{1}{3}$% salt. After adding and mixing the culture, the meat was placed in a beaker, covered and placed in a water bath at 25° C. The pH's of the incubated meat were measured continuously.

A comparison of the results obtained is set forth in the Table below:

TABLE

| | pH values at 75° F. | |
|---|---|---|
| Time | Pediococcus pentosaceus | Pediococcus cerevisiae |
| (hours) | pH | pH |
| 0 | 5.98 | 5.98 |
| 17 | 5.20 | 5.86 |
| 24 | 4.79 | 5.79 |
| 41 | 4.58 | 5.31 |
| 48 | 4.60 | 5.20 |
| 72 | 4.59 | 4.74 |

The test results indicate that inoculating with the *Pediococcus pentosaceus* culture reduces the pH to 5.0 in a significantly reduced time period.

The benefits of this invention are further illustrated in the following Example of the preparation of a pepperoni sausage.

EXAMPLE

Pepperoni

A commercially standard meat formulation for the production of a pepperoni sausage is:
Boneless chuck: 25 lbs.
Regular pork trimmings: 15 lbs.
Lean pork trimmings: 60 lbs.
Spice formulation for 100 lbs. of meat:
Salt: 3 lbs. 6 oz.
Dextrose: 8 oz.
Caraway Seed: 2 oz.
Sweet Spanish Pepper: 9 oz.
Cayenne Pepper: $\frac{2}{3}$ oz.
Ground White Pepper: $2\frac{1}{2}$ oz.
Ground Anise Seed: $\frac{1}{3}$ oz.
Mashed Fresh Garlic: $\frac{1}{2}$ oz.
Pepperoni Pepper:
Whole Anise Seed:
Sodium Erythorbate: $\frac{7}{8}$ oz.
Sodium Nitrite: $\frac{1}{4}$ oz.

Sodium Nitrate (optional): ¼ oz.

The beef is first ground through a coarse plate. Salt, dextrose or cane sugar are then added along with the sodium nitrite in solution and mixed for one or two minutes. The desired proportion of pork is ground through a coarse plate and added to the beef in the mixer. The remaining spices and sodium erythorbate are added. The Pediococcus pentosaceus starter culture is mixed with water and added to the mixture. The entire mixture is reground through a 3/16 in. plate. Whole black pepper is added and the mixture is stuffed into casings and moved to the "green room" or fermentation chamber.

The stuffed sausage is held in the fermentation chamber at a temperature in the range of 50° F. to 80° F. The sausage remains in the fermentation cycle until a desired pH of 5.0 or less is obtained. If the fermentation is conducted at 75° F., a desirable pH is reached in less than 24 hours. Similarly, if the fermentation temperature is at 65° F., the desired pH is reached in less than 48 hours. Finally, if the fermentation temperature is maintained at 55° F., the desired pH is reached in less than 72 hours.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. In the method of producing dry or semi-dry sausage wherein a meat emulsion is inoculated and fermented with lactic acid producing microorganisms, the improvement which comprises using *Pediococcus pentosaceus* ATCC 10791 as the lactic acid producing microorganism in the form of a starter culture concentrate containing from $10^8$ to $10^{13}$ viable cells per milliliter, the concentrate being added in an amount of from 0.1% to 10% based upon the weight of the meat emulsion.

2. In the method of producing dry or semi-dry sausage wherein a meat emulsion is inoculated and fermented with lactic acid producing microorganisms, the improvement which comprises using *Pediococcus pentosaceus* ATCC 10791 as the lactic acid producing microorganism in the form of a starter culture concentrate containing from $10^8$ to $10^{13}$ viable cells per milliliter, the concentrate being selected from the family consisting of freeze dried concentrates, frozen concentrates and liquid stabilized concentrates and being added in an amount of from 0.1% to 10% based upon the weight of the meat emulsion, and fermenting said meat emulsion until its pH is below about 5.0 by maintaining the emulsion at a temperature in the range of from 50° F. to 80° F. for not longer than 72 hours.

3. The method of claim 2 wherein the fermentation is conducted at a temperature in the range of 60° to 80° F. for not longer than 48 hours.

4. In the method of producing dry or semi-dry sausage wherein a meat emulsion is inoculated and fermented with lactic acid producing microorganisms, the improvement which comprises using *Pediococcus pentosaceus* ATCC 10791 as the lactic acid producing microorganism in the form of a starter culture concentrate containing from $10^8$ to $10^{13}$ viable cells per milliliter, the concentrate being added in an amount of from 0.1% to 10% based upon the weight of the meat emulsion, and conducting the fermentation step at a temperature in the range of 70° to 80° F. for not more than 24 hours to obtain a pH of less than 5.0.

5. The method of claim 4 wherein the starter culture concentrate is in the freeze-dried, frozen or liquid stabilized condition.

6. The method of claim 4 further comprising the step of adding a second microorganism as the lactic acid producing microorganism to the meat emulsion wherein said second microorganism is Pediococcus cerevisiae.

7. The method of claim 6 wherein said second mircroorganism is added in an amount of 33% to 67% by weight of the starter culture concentrate.

8. The method of claim 6 further comprising the step of adding a second microorganism as the lactic acid producing microorganism to the meat emulsion where said second microorganism is Streptococcus lactis.

9. The method of claim 4 further comprising the step of adding a second microorganism as the lactic acid producing microorganism to the meat emulsion wherein said second microorganism is member of the Micrococcus genus.

10. The method of claim 9 wherein the second microorganism is Micrococcus varians ATCC 15301 added in an amount of 10% to 30% by weight of the starter culture concentrate.

* * * * *